United States Patent
Hackenberg

(10) Patent No.: US 9,683,875 B2
(45) Date of Patent: Jun. 20, 2017

(54) DISPLAY DEVICE AND METHOD FOR A HYBRID VEHICLE HAVING SUCH A DISPLAY DEVICE

(71) Applicant: Volkswagen Aktiengesellschaft, Wolfsburg (DE)

(72) Inventor: Ulrich Hackenberg, Wettstetten (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 328 days.

(21) Appl. No.: 14/201,278

(22) Filed: Mar. 7, 2014

(65) Prior Publication Data

US 2014/0182509 A1    Jul. 3, 2014

Related U.S. Application Data

(63) Continuation of application No. PCT/EP2012/003394, filed on Aug. 9, 2012.

(30) Foreign Application Priority Data

Sep. 7, 2011 (DE) .................. 10 2011 112 707

(51) Int. Cl.
*B60Q 1/00* (2006.01)
*G01D 13/22* (2006.01)
(Continued)

(52) U.S. Cl.
CPC ............. *G01D 13/22* (2013.01); *B60K 35/00* (2013.01); *B60W 50/14* (2013.01);
(Continued)

(58) Field of Classification Search
CPC ............ B60K 35/00; B60K 2350/1064; B60K 2350/965; B60K 6/20; G01D 13/22
(Continued)

(56) References Cited

U.S. PATENT DOCUMENTS 4,623,870 A * 11/1986 Irimajiri ................ G07C 5/004
340/439
6,480,106 B1    11/2002 Crombez et al.
(Continued)

FOREIGN PATENT DOCUMENTS

DE      36 40 452 A1    6/1988
DE     195 33 829 C1    9/1996
(Continued)

*Primary Examiner* — Joseph Feild
*Assistant Examiner* — Rufus Point
(74) *Attorney, Agent, or Firm* — Muncy, Geissler, Olds & Lowe, P.C.

(57) ABSTRACT

A display device for a hybrid vehicle having a first drive source and at least one second drive source for driving the hybrid vehicle according to a load requirement by the driver. The display device has at least one display component for displaying a value of a load requirement predetermined by the driver at a specific time and, when the hybrid vehicle is driven exclusively by the at least one second drive at said time, at least one additional display component is provided for visualizing a limit of a maximum load requirement retrievable by the driver at said time, wherein if said load requirement is exceeded, the first drive source is also or exclusively activated for driving the hybrid vehicle. At least one further display component can be activated, via which the visualization of at least one such mode of operation of the hybrid vehicle is possible.

17 Claims, 2 Drawing Sheets

(51) Int. Cl.
   *B60K 35/00* (2006.01)
   *B60W 50/14* (2012.01)
(52) U.S. Cl.
   CPC ... *B60K 2350/1064* (2013.01); *B60K 2350/965* (2013.01); *B60W 2050/146* (2013.01)
(58) Field of Classification Search
   USPC ............... 340/438, 439, 461, 636.1, 636.15; 701/22
   See application file for complete search history.

(56) References Cited

U.S. PATENT DOCUMENTS

| | | | | |
|---|---|---|---|---|
| 7,023,216 | B2* | 4/2006 | Prema | B60K 6/445 |
| | | | | 324/427 |
| 7,898,405 | B2* | 3/2011 | Burke | G01D 11/28 |
| | | | | 180/65.21 |
| 8,359,152 | B2 | 1/2013 | Jinno | |
| 8,754,779 | B2* | 6/2014 | Ruther | G07C 5/0816 |
| | | | | 340/870.01 |
| 8,836,544 | B1* | 9/2014 | Balogh | B63H 21/17 |
| | | | | 340/439 |
| 9,162,575 | B2* | 10/2015 | Strasser | B60K 37/02 |
| 9,493,073 | B2* | 11/2016 | Limbacher | B60K 37/06 |
| 9,513,702 | B2* | 12/2016 | Cho | G06F 3/013 |
| 2002/0186228 | A1* | 12/2002 | Kobayashi | B60K 35/00 |
| | | | | 345/633 |
| 2007/0278856 | A1* | 12/2007 | Craig | B60T 13/588 |
| | | | | 303/122.09 |
| 2009/0125173 | A1* | 5/2009 | Komatsu | B60K 6/445 |
| | | | | 701/22 |
| 2009/0234528 | A1* | 9/2009 | Crombez | G07C 5/0825 |
| | | | | 701/31.4 |
| 2009/0322503 | A1* | 12/2009 | Suzuki | B60W 50/14 |
| | | | | 340/438 |
| 2010/0007481 | A1* | 1/2010 | Uchida | H01M 10/42 |
| | | | | 340/455 |
| 2010/0057281 | A1* | 3/2010 | Lawyer | G07C 5/0825 |
| | | | | 701/22 |
| 2010/0106351 | A1* | 4/2010 | Hanssen | B60K 6/48 |
| | | | | 701/22 |
| 2011/0205044 | A1* | 8/2011 | Enomoto | B60K 35/00 |
| | | | | 340/439 |
| 2012/0179420 | A1* | 7/2012 | Gilman | B60K 35/00 |
| | | | | 702/165 |
| 2012/0319828 | A1* | 12/2012 | Krauss | B60K 35/00 |
| | | | | 340/425.5 |
| 2013/0218406 | A1* | 8/2013 | Tamai | B60K 35/00 |
| | | | | 701/34.4 |
| 2014/0077941 | A1* | 3/2014 | Yamamura | B60K 35/00 |
| | | | | 340/438 |
| 2015/0009024 | A1* | 1/2015 | Strasser | B60K 37/02 |
| | | | | 340/439 |
| 2015/0325034 | A1* | 11/2015 | Nakata | G06T 15/005 |
| | | | | 345/419 |

FOREIGN PATENT DOCUMENTS

| | | |
|---|---|---|
| DE | 100 65 602 A1 | 7/2002 |
| DE | 101 08 934 A1 | 9/2002 |
| DE | 10 2006 017 634 A1 | 10/2007 |
| DE | 10 2007 060 646 A1 | 6/2009 |
| DE | 10 2008 040 566 A1 | 1/2010 |
| DE | 10 2009 035 139 A1 | 2/2011 |
| EP | 2 070 787 A1 | 6/2009 |
| EP | 2 402 195 A2 | 1/2012 |
| JP | 2008-206301 A | 9/2008 |
| KR | 10-2005-0043353 A | 11/2005 |
| KR | 10-2008-0038596 | 4/2008 |
| KR | 10-2010-0015510 A | 12/2010 |
| WO | WO 2008/056529 A1 | 5/2008 |

\* cited by examiner

DISPLAY DEVICE AND METHOD FOR A HYBRID VEHICLE HAVING SUCH A DISPLAY DEVICE

This nonprovisional application is a continuation of International Application No. PCT/EP2012/003394, which was filed on Aug. 9, 2012, and which claims priority to German Patent Application No. 10 2011 112 707.4, which was filed in Germany on Sep. 7, 2011, and which are both herein incorporated by reference.

BACKGROUND OF THE INVENTION

Field of the Invention

The invention relates to a display device for a hybrid vehicle.

Description of the Background Art

In order to satisfy ever more demanding requirements for low noise emissions, low exhaust emissions, and low fuel consumption both now and in the future, carmakers are putting greater efforts into new vehicle concepts.

In these efforts, increasing use is being made of the concept of so-called hybrid vehicles. Hybrid vehicles are vehicles that are driven by more than one drive source; in current parlance, this is primarily thought of as the combination of an internal combustion engine and an electric machine that can be operated as an electric motor or multiple electric machines and the associated energy storage devices (fuel tank and traction battery). Apart from such a design of the hybrid vehicle, other combinations are of course also possible, for example the combination of a fuel cell and at least one electric machine.

In hybrid vehicles, the conventional tachometer frequently is replaced or augmented as a display device by a power meter, with which the driver command (load requirement) currently being drawn is displayed in different driving modes. The position of the power meter pointer here correlates more or less linearly with the gas pedal position selected by the driver.

Typical power meters are often designed as a circular instrument with multiple labeled scale graduations, from which the driver can read off different driving states.

For example, when the ignition is switched off, the pointer is in an "off" position. With the ignition turned on and in readiness for driving (but the driver is not depressing the gas pedal), the pointer moves to a "ready" position. If the driver applies slight to moderate throttle, the pointer moves between the "ready" position and a one hundred percent position. Frequently, a portion of this region is also graphically emphasized as a so-called "eco" region in order to deter the driver from excessive, high-fuel-consumption accelerations.

If the driver applies high to full throttle, then the electric machine in hybrid vehicles frequently assists the internal combustion engine temporarily as an electric motor. This is designated as the so-called "boost" mode. Since the total power achieved or total torque achieved is above the full load curve of the internal combustion engine, the power meter pointer is generally positioned above 100% of the power meter scale in this "boost" region.

In contrast, during braking the electric machine in hybrid vehicles operates as a generator and is used to charge the battery. This driving mode is likewise visually emphasized on the power meter as the "charge" region (the so-called regeneration region).

Moreover, a so-called "normal" mode and an "electric travel mode" (E mode) are frequently offered in hybrid vehicles. In normal mode, the division between driving with the electric motor (E driving) and driving with the internal combustion engine (ICE driving) is configured for minimum fuel consumption. Hence, electric driving takes place only at operating points where the efficiency of the internal combustion engine is poorer than the efficiency of electric driving including the charging and discharging efficiency of the traction battery. However, electric driving performance is restricted in certain respects by this approach.

By contrast, in E mode maximum electric driving performance is offered to the customer regardless of its influence on fuel consumption. The available torque and the available power at which a so-called "restart" can be initiated are thus significantly higher.

A restart can be understood to mean the driving state in which, following operation of the hybrid vehicle exclusively with the electric motor, the hybrid vehicle's internal combustion engine is again used additionally or exclusively as the drive source.

In hybrid vehicles, the driver may at times wish to keep the vehicle in the purely electric driving mode over a certain period, or in other words may wish to avoid restarting the internal combustion engine (which can be triggered by "stepping on the gas" too hard, for instance). However, this is comparatively difficult because of the relatively low power of the electric machine in hybrid vehicles as compared to the power of the internal combustion engine.

To this is added the fact that the load requirement (in particular the torque or power) at which restart is initiated depends on a very wide variety of boundary conditions, and thus is not always the same. When a high voltage (HV) battery is at a low temperature, for instance, the power of the traction battery is severely limited, causing the internal combustion engine to restart even for very low driver commands. As a general rule, purely electric driving is not possible at all below a certain battery temperature.

It is also necessary to take into account the fact that conventional hybrid batteries are typically operated in a state-of-charge window (SOC) between approximately 35% and 65% of their maximum charge state. If the charge state approaches the minimum permissible SOC, then restart is initiated even at relatively low power for reasons of operating strategy and battery physics.

All of the aforementioned effects thus have the result that the restart point is not constant within the display of the power meter and sometimes even changes successively during one electric driving phase.

In order to nevertheless provide the driver of a hybrid vehicle with a display device with which the driver can estimate when the internal combustion engine will be additionally switched on during electric-only travel, or in other words when a restart will take place, DE 10 2007 060 646 A1, which is incorporated herein by reference, proposes an additional display device. This additional display device serves to display the continually changing restart point, and can be provided as a trailing pointer or as a ring segment on the display area of the display device.

Against the background of the above remarks, it is nevertheless desirable to further improve the prior art display devices with regard to their informative value for the driver.

SUMMARY OF THE INVENTION

It is therefore an object of the invention to improve a generic device for a hybrid vehicle such that information in addition to the restart point is also made available to the driver as to how he can actively influence this restart point (at least for a certain period of time).

With regard to the display device, the invention thus proceeds from a display device for a hybrid vehicle having a first drive source and at least one second drive source of a different type than the first drive source for driving the hybrid vehicle in accordance with a load requirement from the driver. The display device has at least one display component for displaying a value of a load requirement specified by the driver at a specific point in time, and, when the hybrid vehicle is driven exclusively by the at least one second drive source at this point in time, at least one additional display component is provided for visualizing a limit of such a maximum load requirement that can be drawn by the driver at this point in time, where exceeding this limit causes the first drive source for driving the hybrid vehicle to be activated in addition or exclusively.

According to an embodiment of the invention, at least one additional display component can now be activated with which it is possible to visualize at least one such operating mode of the hybrid vehicle in which the maximum load requirement that can be drawn by the driver when the hybrid vehicle is driven exclusively by the at least one second drive source at this point in time is increased as compared to a different operating mode.

By means of the display device, the driver is thus provided an additional piece of information on the change in the restart point, and he can decide, as a function of this information, which operating mode he wishes to operate the vehicle in.

This is very helpful, primarily when the driver places utmost priority on electric-only driving of his hybrid vehicle for a certain time.

In this context, it is useful to employ an internal combustion engine as the first drive source and an electric machine that can be operated as an electric motor as the second drive source. These drive sources are already very mature technologies, and can hardly be faulted with regard to their reliability.

In particular with regard to an elegant yet also clear representation, it has proven advantageous for the at least one additional display device to be implemented or represented in the manner of a pointer. The pointer can be implemented as a real pointer, although a virtual representation of the pointer on the display area of the display device is highly recommended in order to reduce the construction effort. This can easily be accomplished with freely programmable displays that are available today.

In this context, it is very beneficial for an easily comprehended visualization if the display component is at least sometimes represented as a pointer that is discontinuous in the longitudinal direction.

As already mentioned, the invention also relates to a method for displaying values of a load requirement on the drive train of a hybrid vehicle.

According to an embodiment of the invention, provision is made here that a visualization can be activated for at least one such operating mode of the hybrid vehicle in which the maximum load requirement that can be drawn on by the driver in the case of the hybrid vehicle being driven exclusively by the at least one second drive source at this point in time is increased as compared to another operating mode.

This visualization thus produces additional information and a decision-making aid for the driver of a hybrid vehicle with regard to an operating mode to be selected. In this context, the operating mode that increases the maximum load requirement that it is possible to draw can be a so-called E mode (as described above), for example. But it is possible for other such operating modes that influence the restart point of the hybrid vehicle to be available for selection, either as an alternative or in addition.

Even though other drive sources are perfectly possible, the use of an internal combustion engine as the first drive source and at least one electric machine that can be operated as an electric motor as the second drive source appears to be the most practical from a current perspective on account of the reliability that can be expected.

According to a further development of the invention, provision can be made that a brief audible signal is output upon activation and/or deactivation of the operating mode that increases the maximum load requirement that can be drawn.

As an alternative or in addition, another advantageous possibility is that a brief visual signal is output upon activation and/or deactivation of the operating mode that increases the maximum load requirement that can be drawn.

All of this contributes to making the driver aware of the changed operating mode.

In order to contribute to minimizing electric power consumption, provision can be made that the visualization of the operating mode that increases the maximum load requirement that can be drawn only takes place after activation of this operating mode.

Nevertheless, optimal information and optimal assistance in decision-making is provided to the driver if the visualization of the operating mode that increases the maximum load requirement that can be drawn takes place continuously.

It can be very advantageous in this context for a reversal (inversion) in the graphical representation of the display component to take place due to activation and/or deactivation of the operating mode that increases the maximum load requirement that can be drawn.

For example, if the ("inactive") restart limit that can be increased through activation of the E mode is represented by a discontinuous pointer when normal mode is activated, and the currently applicable ("active") restart limit due to normal mode is represented by a continuous pointer, then a distinction between the "active" (normal) and "inactive" (increased) restart limit is indicated to the driver in an easily understood manner.

If the driver decides on the basis of this information to activate the E mode, then reversal (inversion) of the graphical representation takes place. The pointer indicating the increased restart limit is now shown in continuous form (active), and the pointer indicating the "normal" restart limit becomes discontinuous (inactive).

In this way, the driver is informed at all times as to which restart limit is currently applicable, which restart limit would take effect as a result of changing the driving mode, and whether an increased restart limit (E mode) is activated. If E travel is not possible at all at the moment (e.g., because the HV battery temperature is too low, because of heating power demand, or because "on-board" diagnostics are required), then the pointers visualizing the restart limits either are not shown or are located in a type of "zero position."

Other possibilities are also conceivable for the graphical representation of the display component and the associated option of an inversion in the representation, however.

Finally, in addition a hybrid vehicle is proposed that is equipped according to the invention with at least one display device according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
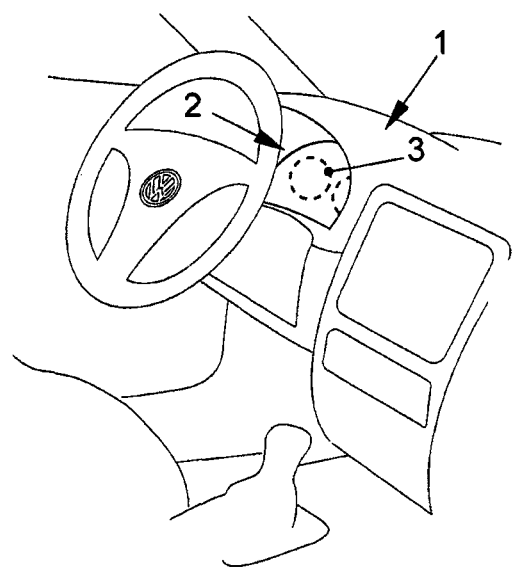
FIG. 1 shows a passenger compartment of a motor vehicle with a display device according to the invention as part of an instrument cluster.

Referring to FIG. 1 there is shown a passenger compartment of a hybrid vehicle 1 in the region of an instrument cluster 2. A display device 3 according to the invention is provided as part of the instrument cluster 2.

Figure 2:
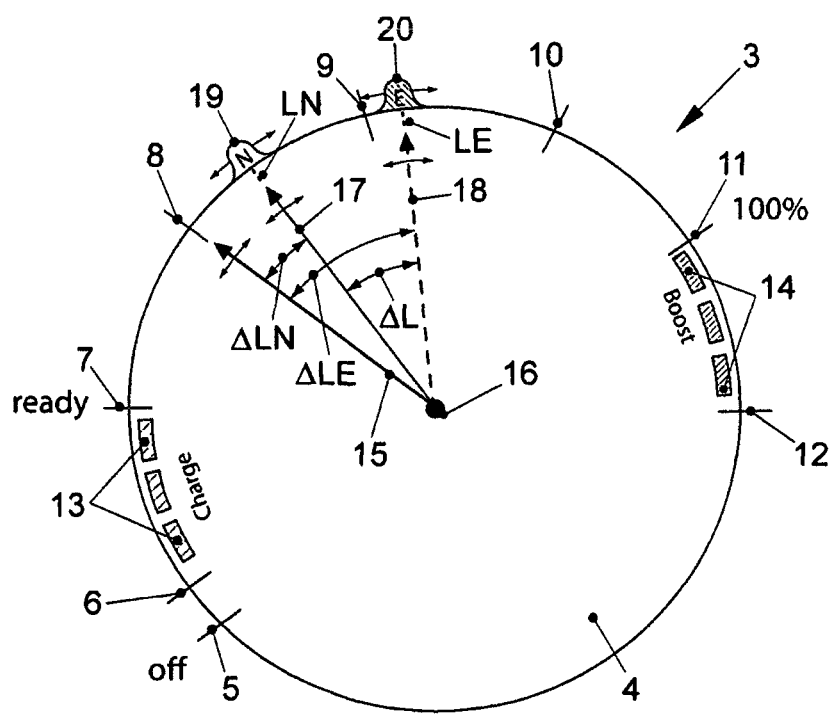
FIG. 2 shows the display device according to the invention in a first operating mode (normal mode) of the hybrid vehicle in electric-only travel.
Figure 3:
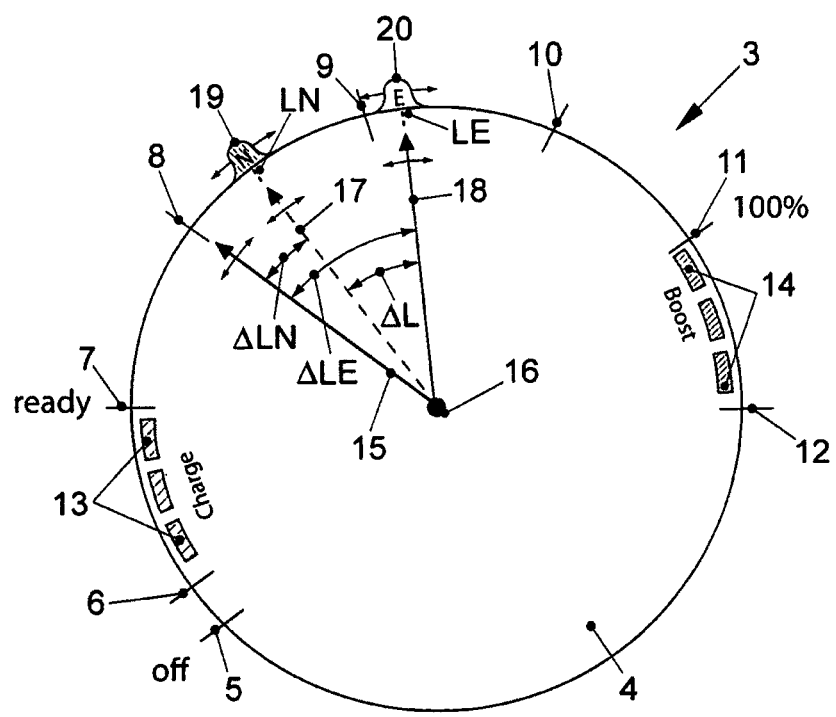
FIG. 3 shows the display device according to the invention in a second operating mode (E mode) of the hybrid vehicle, likewise in electric-only travel.

The display device 3 shall now be explained in detail using FIG. 2 and FIG. 3.

It is evident that the display device 3 is implemented in the form of a circular instrument with a circular display area 4, however, any shape can be implemented. In this design, the display area 4 can be implemented as a so-called freely programmable display. Provided at the edge of the display area 4 are scale graduations 5 through 12, between which a display component 15 in the form of a pointer can move in a rotary manner about an axis of rotation 16.

In the exemplary embodiment, the pointer 15 is implemented as a real pointer, but it can also be represented virtually on the display area 4. The pointer 15 serves to display a load requirement specified by the driver. When the ignition is turned off, the pointer 15 is in an "off" position on the scale graduation 5 ("off" position).

When the ignition is turned on, the pointer 15 travels to a "ready" position on the scale graduation 7 ("ready" position). This indicates that the vehicle is ready to drive, regardless of whether propulsion is provided by the internal combustion engine or the electric machine(s).

Arranged between the scale graduations 6 and 7 are display component 13 for displaying charging operation (regeneration). The display component 13 can be implemented in the form of LEDs, for example, or also in the form of areas on the display 4 that are graphically highlighted in another way.

If the driver applies slight to moderate throttle, the pointer 15 moves between the scale graduation 7 and the scale graduation 11 (100% display). In the illustrations, the pointer 15 is located precisely on the scale graduation 8, which is supposed to indicate a load requirement from the driver of approximately 25% of the maximum load requirement.

If the driver applies high to full throttle, then the electric machine temporarily assists the internal combustion engine as an electric motor, and thus enters a so-called "boost" mode, which is shown by the region between the scale graduations 11 and 12 (display component 14). This region is intentionally positioned above the scale graduation 11, since the total power achieved in the boost region is above the full load line of the internal combustion engine.

During braking, the electric machine acts as a generator and is used for charging the traction battery. In such cases, the pointer 15 moves in the regeneration region ("Charge") indicated by the display component 13 between the scale graduations 6 and 7; the harder the driver brakes, the further it moves.

In addition, a second display component 17 is provided in the form of a pointer. The pointer 17 serves to display a load requirement LN that can be drawn by the driver in normal mode. If, during an electric driving phase, the driver draws a load requirement that exceeds the load requirement LN that can be drawn at a certain point in time, then a restart of the internal combustion engine to assist the electric motor is initiated.

A remaining distance ΔLN from the load requirement drawn at a certain point in time to the maximum load requirement LN that can be drawn for electric-only travel at this point in time is rendered easily visible to the driver by the position of the pointers 15 and 17.

It should be noted here that in normal mode (which is active in FIG. 2), a restart always takes place when the pointers 15 and 17 are crossed. Such a crossing can take place when the pointer 15 approaches the pointer 17 from below as a result of an increasing load requirement by the driver, or else when the pointer 17 (as a result of a decrease in the electrical power capability of the system) approaches the pointer 15 from above (which is to say higher load values or power values).

An additional display device 18 is provided in the form of a pointer, wherein the pointer 18 serves to indicate a load requirement LE that can be drawn by the driver at a certain point in time in E mode in which electric-only travel is still possible, which is to say that a restart will not yet occur.

To highlight the fact that the load requirement LE from the driver cannot be drawn at the present time since the vehicle is in normal mode, the pointer 18 is displayed in discontinuous form.

In similar fashion to the distance ΔLN mentioned above, a distance ΔLE can also be read easily by the driver; this distance represents the remaining distance from the load requirement drawn to the maximum load requirement (for electric-only travel) that can be drawn in E mode.

In like manner, a possible increase ΔL in load requirement that can be drawn by activating the E mode during electric travel is of course also easily visible to the driver.

In addition or as an alternative to the pointers 17 and 18, if the display area 4 is enlarged appropriately it is possible to provide suitable symbols or letters 19 or 20 (for example, "N" for normal mode or "E" for electric mode) above the tips of the pointers, which symbols or letters travel along with the movement of the pointers 17 and 18. A type of tab display would be entirely possible here, for example. Since the normal mode is active at the point in time shown in FIG. 2, the tab 19 is graphically highlighted, and the tab 20 is shaded gray and is thus marked as inactive.

If the driver now decides, based on this information supplied by the display device 3, to activate the E mode, he can use an operating device that is not shown in detail for this purpose. A brief audible signal is then output. At the same time, a brief visual signal is output as well. The visual signal can be implemented by a brief increase in the brightness of the display area 4, the pointer 18, or the tab 20, for example. A brief enlargement of the pointer 18 is likewise possible.

In this way, the driver is informed very clearly of the change in the driving mode that has been activated.

It should also be noted that the activation of the E mode results in a reversal (inversion) in the graphical representation of the pointers 17 and 18 and the tabs 19 and 20 (see FIG. 3). Thus, the pointer 18 is now represented as solid and the tab 20 is highlighted, while the pointer 17 is discontinuous and the tab 19 is shaded gray. This visualizes that the hybrid vehicle is in the activated E mode with correspondingly increased restart limit.

In this way, the driver is informed at all times as to which restart limit is currently applicable, which restart limit would take effect as a result of changing the driving mode, and whether an increased restart limit (E mode) is activated. If E travel is not possible at all at the moment (e.g., because the HV battery temperature is too low, because of heating power demand, or because "on-board" diagnostics are required), then the pointers 17 and 18 and the tabs 19 and 20 visualizing the restart limits and possible load requirements LN or LE either are not shown or are located in a type of "zero position," for example at the scale graduation 7.

In similar fashion to the method described above, a brief visual and/or audible signal is again output when the E mode is deactivated, and the representation of the display component 17 and 18 or 19 and 20 is reversed again.

Even though the visualization of the operating mode (E mode) that increases the maximum load requirement that can be drawn takes place continuously in the exemplary embodiment, it is also possible to perform this visualization only after this operating mode has been activated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display device for a hybrid vehicle having a first drive source and at least one second drive source of a different type than the first drive source for driving the hybrid vehicle in accordance with a load requirement from a driver, the display device comprising:
   at least one first display component for displaying a value of a load requirement specified by the driver at a specific point in time, and, when the hybrid vehicle is driven exclusively by the at least one second drive source in a first operating mode at the specific point in time,
   at least one second display component is provided for visualizing a limit of a maximum load requirement available for drawing by the driver in the first operating mode at this point in time, where exceeding this limit causes the first drive source for driving the hybrid vehicle to be activated in addition or exclusively;
   at least one third display component being activatable with which it is possible to visualize a second operating mode of the hybrid vehicle in which the maximum load requirement available for drawing by the driver when the hybrid vehicle is driven exclusively by the at least one second drive source at the specific point in time is increased as compared to the first operating mode,
   wherein the at least one second drive source is electric powered.

2. The display device according to claim 1, wherein the first drive source is an internal combustion engine and the second drive source is an electric machine that can be operated as an electric motor.

3. The display device according to claim 1, wherein the at least one first, second and third display components are each implemented or represented in the manner of a pointer.

4. The display device according to claim 3, wherein the at least second and third display components are at least sometimes represented as a pointer that are discontinuous in the longitudinal direction.

5. A method for displaying, on a display device, values of a load requirement on a drive train of a hybrid vehicle having a first drive source and at least one second drive source of a different type than the first drive source for driving the hybrid vehicle, the method comprising:
   displaying, by a first display component, a value of a load requirement specified by a driver at a specific point in time;
   visualizing, when the hybrid vehicle is driven exclusively by the at least one second drive source in a first operating mode at this point in time, at least one limit of a maximum load requirement available for drawing by the driver at the specific point in time, where exceeding this limit causes the first drive source for driving the hybrid vehicle to be activated in addition or exclusively and where the limit is displayed by a second display component; and
   activating a visualization of a second operating mode of the hybrid vehicle in which the maximum load requirement available for drawing by the driver when the hybrid vehicle is driven exclusively by the at least one second drive source at the specific point in time is increased as compared to the first operating mode, a limit of the maximum load requirement of the second operating mode being displayed by a third display component.

6. The method according to claim 5, wherein an internal combustion engine is used as the first drive source, and an electric machine that can be operated as an electric motor is used as the second drive source.

7. The method according to claim 5, wherein a brief audible signal is output upon activation and/or deactivation of the second operating mode that increases the maximum load requirement that can be drawn.

8. The method according to claim 5, wherein a brief visual signal is output upon activation and/or deactivation of the second operating mode that increases the maximum load requirement available.

9. The method according to claim 5, wherein the visualization of the second operating mode that increases the maximum load requirement available for drawing only takes place after activation of the second operating mode.

10. The method according to claim 5, wherein the visualization of the second operating mode that increases the maximum load requirement available for drawing takes place continuously.

11. The display device according to claim 1, wherein a reversal in a graphical representation of the second and third display components takes place due to activation and/or deactivation of the second operating mode that increases the maximum load requirement available for drawing.

12. A hybrid vehicle having at least one display device according to claim 1.

13. The display device according to claim 1, wherein a position of the second and third display component is movable on the display device, such that the maximum load requirement indicated by the second and third display component is able to increase or decrease.

14. The display device according to claim 1, wherein when the hybrid vehicle is in the first operating mode, the second display component is displayed in solid lines and the third display component is displayed in dashed lines and when the hybrid vehicle is in the second operating mode, the second display component is displayed in dashed lines and the third display component is displayed in solid lines.

15. The method according to claim 5, wherein a position of the second and third display component is movable on the display device, such that the maximum load requirement indicated by the second and third display component is able to increase or decrease.

16. The method according to claim 5, wherein when the hybrid vehicle is in the first operating mode, displaying the second display component in solid lines and displaying the third display component in dashed lines and when the hybrid vehicle is in the second operating mode, displaying the second display component in dashed lines and displaying the third display component in solid lines.

17. The method according to claim 5, wherein the at least one second drive source is electric powered.

* * * * *